United States Patent [19]

Huff, Jr. et al.

[11] Patent Number: 5,837,128
[45] Date of Patent: Nov. 17, 1998

[54] METHOD FOR GRADING CYLINDRICAL CATALYST PARTICLES IN A BED TO REDUCE PRESSURE DROP

[75] Inventors: George A. Huff, Jr., Naperville; Frederick T. Clark, Wheaton; James L. Taylor, Naperville, all of Ill.

[73] Assignee: Amoco Corporation, Chicago, Ill.

[21] Appl. No.: 653,384

[22] Filed: May 24, 1996

Related U.S. Application Data

[60] Provisional application No. 60/009,942 Jan. 16, 1996.
[51] Int. Cl. [6] .................................................. C10G 47/02
[52] U.S. Cl. ......................... 208/112; 208/213; 208/108; 208/134; 208/251 H; 208/254 H
[58] Field of Search ..................................... 208/213, 108, 208/134, 251 H, 254 H, 112

[56] References Cited

U.S. PATENT DOCUMENTS

| | | | |
|---|---|---|---|
| 3,702,238 | 11/1972 | Armistead et al. | 23/288 |
| 4,142,988 | 3/1979 | Chinchen | 252/373 |
| 4,615,796 | 10/1986 | Kramer | 208/146 |
| 4,830,736 | 5/1989 | Hung et al. | 208/251 H |
| 5,368,722 | 11/1994 | Bartholdy | 208/149 |

FOREIGN PATENT DOCUMENTS 706568  3/1954  United Kingdom .

OTHER PUBLICATIONS

An Article from *Oil & Gas Journal*, vol. 86, No. 51, Dec. 19, 1988 entitled "Improved Catalyst Loading Reduces Guard Reactor Fouling" by Emerson C. Sanford and Roger P. Kirchen, pp. 35–41.

English Language Abstract of Japanese Patent No. 05,228, 356, Jul. 1993.

*Primary Examiner*—Walter D. Griffin
*Assistant Examiner*—Nadine Preisch
*Attorney, Agent, or Firm*—James R. Henes; Robert A. Yesukevich; Frank J. Sroka

[57] ABSTRACT

A method is disclosed for optimizing the pressure drop in the catalytic conversion of a feed in a bed of catalyst particles in a vertically arranged reactor by grading the catalyst particles within the bed by pressure drop.

5 Claims, 2 Drawing Sheets

METHOD FOR GRADING CYLINDRICAL CATALYST PARTICLES IN A BED TO REDUCE PRESSURE DROP

RELATED APPLICATION

This application claims the benefit of U.S. Provisional Application No. 60/009,942, filed on Jan. 16, 1996.

BACKGROUND OF THE INVENTION

1. Field of the Invention

The present invention relates to a process for the catalytic conversion of a feed in a bed of catalyst particles in a vertically arranged reactor, and more particularly concerns an aforesaid catalytic conversion in which the pressure drop in the bed is optimized.

2. Discussion of the Prior Art

It is well-known that the presence of solid material of certain particle size in a feedstock and the formation of insoluble products or by-products during the catalytic conversion of a feedstock in a bed of catalyst particles in a vertically arranged reactor can result in the build-up of a high pressure drop and the development of flow restrictions in the catalyst bed and plugging of the catalyst bed. Traditionally control of such contamination has been made by applying a grading of large diameter particles on top of smaller diameter particles within the catalyst bed. Both the large diameter and smaller diameter particles used have almost the same void fraction, but the average size of the void spaces is different and thus the ability to retain the aforesaid insoluble materials different.

However, Bartholdy, U.S. Pat. No. 5,368,722, issued on Nov. 29, 1994 and European Patent Application No. 94103004.1, published on May 3, 1995, disclose that the aforesaid procedure of grading by particle size has the obvious drawback that in the part of the reactor where accumulation of the aforesaid insoluble materials occurs, there is a limited capacity for storage of such insoluble materials. Exchange of large low void material with high void material has to a large extent improved the capacity for such storage. However, as pointed out in the aforesaid patent and published patent application, situations exist where a layer of large particles having high voids does not have adequate capacity to retain the aforesaid insoluble materials unless a very large volume of such large particles having high voids is used. To solve this problem, both U.S. Pat. No. 5,368,722 and published European Patent Application No. 94103004.1 disclose a fixed bed catalyst system comprising a physical mixture of high void catalyst particles and low void catalyst particles, wherein the particles are mixed in different amounts in different layers of the catalyst bed so as to obtain within the catalyst bed a layered structure with different layers having different mixing ratios of the high and low void particles.

However, as pointed out in both U.S. Pat. No. 5,368,722 and published European Patent Application No. 94103004.1, it is not possible to make an exact calculation of the average size of the void volume, and in order to estimate the average size of the void volume, it is necessary to make certain assumptions concerning the shape and number of the voids.

Hung et al., U.S. Pat. No. 4,830,736, issued May 16, 1989, describes a conventional practice of grading a catalyst bed by varying the catalyst particle size and shape in order to provide decreasing interstitial voidage volume in the direction of feed flow through the bed. This patent discloses as its inventive method the grading of a catalyst bed by catalytic activity by carefully selecting parameters such as the porosity, surface activity, shape and size of the catalyst particles in order to arrive at the desired catalyst activity.

Thus far, no one has disclosed a method for grading catalyst particles within a bed of catalyst particles in order to optimize the pressure drop in the bed that does not involve making certain assumptions regarding the size, dimensions, shape or number of voids in the bed, or even making theoretical or semi-theoretical calculations based on such assumptions. It would be highly desirable to develop a method for grading catalyst particles in a bed to reduce the pressure drop through the bed without the need for the aforesaid assumptions or calculations.

OBJECTS OF THE INVENTION

It is therefore a general object of the present invention to provide an improved method for optimizing the pressure drop in the catalytic conversion of a feed in a bed of catalyst particles in a vertically arranged reactor by grading the catalyst particles within the bed such that the aforesaid desirable features and overcomes the aforesaid problems are afforded.

More particularly, it is an object of the present invention to provide an improved aforesaid method that optimizes the pressure drop within the catalyst bed and reduces the rate of pressure drop build-up.

It is a further object of the present invention to provide an aforesaid method that does not depend on theoretical or semi-theoretical calculations based on assumptions regarding the size, shape or dimensions of the catalyst particles or the number of voids between particles in the catalyst bed.

Other objects and advantages of the present invention will become apparent upon reading the following detailed description and appended claims.

SUMMARY OF THE INVENTION

These objects are achieved by the method of the present invention for optimizing the pressure drop in the catalytic conversion of a feed in a bed of catalyst particles in a vertically arranged reactor comprising grading the catalyst particles within the bed by pressure drop such that catalyst particles within the catalyst bed have progressively higher pressure drops in the direction of feed flow.

DETAILED DESCRIPTION OF THE PREFERRED EMBODIMENTS

Figure 1:
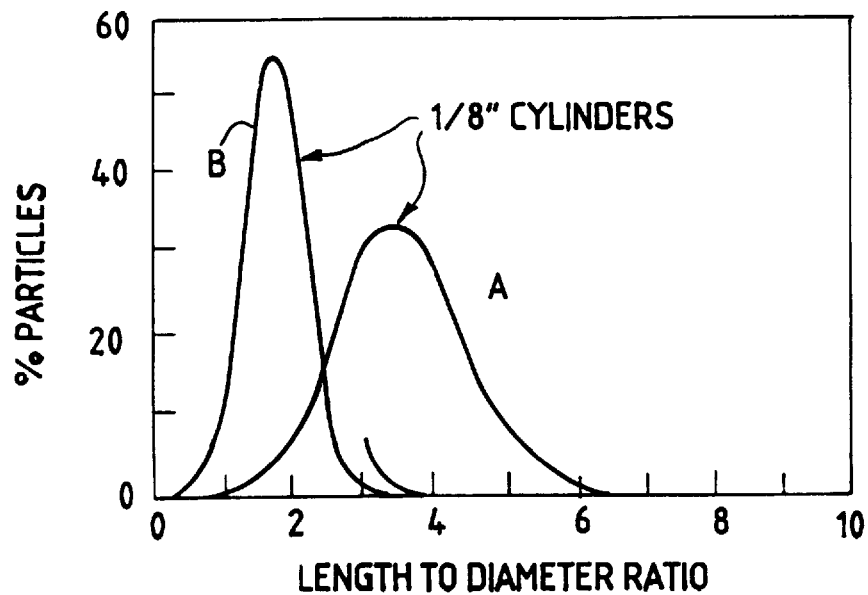
FIG. 1 is a graph showing the particle length-to-diameter distribution for two lots of cylindrical catalyst particles, with each lot having ⅛-inch diameter particles but with one lot having an average particle length-to-diameter ratio of 1.8 (Particles B), and the other lot having an average particle length-to-diameter ratio of 3.5 (Particles A).

The method of the present invention can be performed in any vertically arranged reactor containing either a packed or moving bed of catalyst particles. Preferably, the reactor contains a packed bed of catalyst particles, which more preferably have the same shape, shortest dimension (such as diameter) and composition. The reaction mixture in the method of this invention can be a gas, liquid or a mixture thereof. The reaction mixture can be flowed upward, downward or radially, through the catalyst bed in the method of this invention. Catalyst particles having any convenient shape, size or composition or a combination (not necessarily a uniform mixture) of catalyst particles having a plurality of shapes, sizes or compositions can be employed in the method of this invention. For example, typical shapes of suitable catalyst particles include cylinders, multilobes (such as trilobes or quadrolobes), spheres, rings and wagon wheels. Preferably, substantially all of the catalyst particles employed in the bed in the method of this invention have the same shape, and more preferably that single shape is cylindrical, spherical or multilobe, and most preferably that single shape is multilobe.

The catalyst particles are graded by pressure drop within the bed of catalyst particles in the method of this invention. As employed in the art and herein, the term "graded" means that the pressure drop of the catalyst particles within the bed is changed gradually through the catalyst bed in the direction of feed flow through the catalyst bed. Thus, the catalyst particles in the bed are graded such that layers of catalyst particles within the catalyst bed have progressively higher pressure drops in the direction of feed flow. Thus, when the feed is flowed downward through the catalyst bed, the catalyst particles within the bed are graded such that the catalyst particles in progressively lower layers within the bed have progressively higher pressure drops. When the feed is flowed upward through the catalyst bed, the catalyst particles within the bed are graded such that the catalyst particles in progressively higher layers within the bed have progressively higher pressure drops.

One convenient method to grade the catalyst particles within the bed by pressure drop is to rank discrete quantities or lots of the catalyst particles by their pressure drops and then to load the discrete quantities or lots of catalyst particles into the reactor sequentially in the order of increasing or decreasing pressure drop, depending on the intended direction of feed flow through the reactor. Catalyst lot sizes vary according to the catalyst manufacturing process, but generally range in size from about 1000 pounds each to over 10,000 pounds each. Several such lots are typically needed to fill the reactor bed. The pressure drop of each such lot is determined by measuring the pressure drop of a smaller representative sample of the lot. This pressure drop measurement procedure is then repeated for all other lots to be loaded into the reactor. The catalyst lots are then loaded into the reactor in the order of progressively increasing or decreasing pressure drop, with the highest pressure drop material at the reactor outlet and the lowest pressure drop material at the reactor inlet.

One suitable procedure used to measure the pressure drop of the catalyst lot comprises loading from about one quart up to about 3 gallons of representative catalyst sample into a 3-foot long verticle tube having an inner diameter of 2-inches. Once loaded, the tube is mechanically vibrated in the axial direction for about five minutes to compact the catalyst bed. Nitrogen flow is then established across the bed at elevated total pressures ranging from about 10 psig to 50 psig, with the pressure drop measured across two pressure taps spaced at the inlet and outlet of the catalyst bed.

A second convenient method to effectively grade the catalyst particles within the bed by pressure drop is to classify the catalyst particles by the ratio of their longest dimension-to-their shortest dimension (such as length-to-diameter) and then to load and grade the catalyst particles in the bed such that the catalyst particles within the bed have progressively lower ratios of their longest dimension to their shortest dimension in the direction of feed flow. To use this method, it is highly preferred that the catalyst particles have a single shape, such as cylindrical, spherical, or multilobe. For example, when the catalyst particles within the bed are cylindrical, they are graded by the ratio of their length-to-their diameter such that the ratios of the length-to-the diameter of the catalyst particles within the bed are progressively lower in the direction of feed flow. The length-to-diameter ratio can be determined for a representative sample of each catalyst lot by several methods. One method is based on a simple average of the physically measured length-to-diameter ratio of a number of representative particles. A second method is based on an average length-to-diameter ratio for representative particles weighted by particle mass. The catalyst lots are then loaded into the reactor in the order of progressively increasing or decreasing catalyst length-to-diameter ratios, depending on the intended direction of feed flow through the reactor. Preferably, when the catalyst particles are cylindrical, their diameters are substantially the same throughout the catalyst bed, and the catalyst particles are then graded by their length such that catalyst particles within the bed are progressively shorter in the direction of feed flow.

Thus, the method of the present invention permits the combined effect on the pressure drop from similarities or differences in the various shapes and sizes of the catalyst particles in the bed to be determined by direct measurement of the pressure drop—or of the ratio of the longest dimension-to-the shortest dimension—of the individual lots of catalyst particles being introduced into the catalyst bed.

Thus, the need for assumptions and theoretical calculations is totally eliminated and is replaced by measurable parameters.

To illustrate, FIG. 1 contains a plot of the distribution of the particle length-to-diameter ratios for each of two different batches of 0.125-inch diameter cylindrical catalyst particles. The batch designated A Particles had an average length-to-diameter ratio of 3.5 and its average pressure drop was measured and defined as 1.0 on a scale of relative average pressure drops. The batch designated as B Particles had an average length-to-diameter ratio of 1.8, and its measured average pressure drop was 1.5 relative to the average pressure drop of 1.0 of the A Particles batch. Thus, for two batches of catalyst particles having the same diameter, the batch of catalyst particles having the greater length has the lower average pressure drop.

Figure 2:
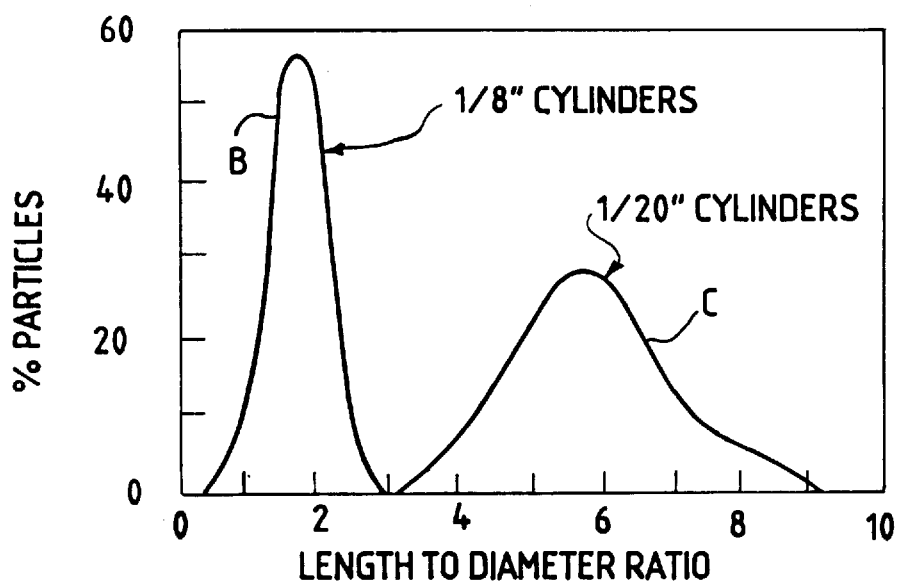
FIG. 2 is a graph showing the particle length-to-diameter distribution for two lots of cylindrical catalyst particles, with one lot having ⅛-inch diameter particles having an average particle length-to-diameter ratio of 1.8 (Particles B) and the other lot having ½₀-inch diameter particles having an average particle length-to-diameter ratio of 6.3 (Particles C).

Similarly, FIG. 2 contains a plot of the distribution of the particle length-to-diameter ratios for each of the aforesaid batch of B Particles of 0.125-inch diameter cylindrical catalyst particles and a batch of C Particles of 0.05-inch diameter cylindrical catalyst particles. The pressure drop of the batch of C Particles was measured as 1.7 relative to the aforesaid measured pressure drop of 1.5 of the aforesaid batch of B Particles. Thus, the relative measured pressure drop of the batch of C Particles was only 15 percent larger than the relative measured pressure drop of the batch of B Particles. By contrast, calculations based on the Ergun Equation for single phase flow (G. Froment and K. Bischoff, "Chemical Reactor Analysis & Design," John Wiley & Sons, page 477, 1979) indicate that the pressure drop of the batch of smaller diameter C Particles should be about 250 percent of the pressure drop of the batch of larger diameter B Particles. This illustrates clearly that the relatively higher length-to-diameter ratio of the 0.05-inch diameter C Particles compensated for most of the increase predicted by the Ergun Equation in the pressure drop of the batch of C Particles over the pressure drop of the 0.1 25-inch diameter B Particles.

Another illustration of the benefits of the method of this invention involved a comparison of the pressure drops of two catalyst beds containing both a batch of the same B Particles described above and having a 0.125-inch diameter and a relative average length-to-diameter ratio of 1.8 and a batch of D Particles also having a 0.125-inch diameter but having instead a relative average length-to-diameter ratio of 1.0. The pressure drops of a reactor containing a packed bed (1) 100% of which is B Particles, (2) 95% of which is a discrete layer of B Particles and 5% of which is a discrete layer of D Particles, (3) 90% of which is a discrete layer of B Particles and 10% of which is a discrete layer of D Particles, (4) which is a uniform mixture 95% of which is B Particles and 5% of which is D Particles, (5) which is a uniform mixture 90% of which is B Particles and 10% of which is D Particles, and (6) 100% of which is D Particles. In this comparison, the relative measured pressure drop of the batch of B Particles was 1.0 and the relative measured pressure drop of the batch of D Particles was 2.23. When the B and D Particles were in separate layers, the D Particles were in the lower layer, and the feed was flowed downward through the reactor. The relative measured pressure drops are presented in Table 1.

TABLE 1

| Bed Composition | Relative Measured Pressure Drop |
| --- | --- |
| (1) 100% of B Particles | 1.00 |
| (2) 95% in a layer of B Particles and 5% in a separate layer of D Particles | 1.06 |
| (3) 90% in a layer of B Particles and 10% in a separate layer of D Particles | 1.12 |
| (4) a uniform mixture of 95% B Particles and 5% D Particles | 1.18 |
| (5) a uniform mixture of 90% B Particles and 10% D Particles | 1.23 |
| (6) 100% of D Particles | 2.23 |

The data in Table 1 illustrates clearly that when the catalyst bed is made up of 95% of B Particles and 5% of D Particles, the relative measured pressure drop across the bed is 1.06 when the B Particles and D Particles are in separate layers, which is less than the relative measured pressure drop of 1.18 when the B Particles and D Particles are uniformly intermixed. When the catalyst bed is made up of 90% of B Particles and 10% of D Particles, the relative measured pressure drop across the bed is 1.12 when the B Particles and D Particles are in separate layers, which is less than both (a) the relative measured pressure drop of 1.23 when the same amounts of B Particles and D Particles are uniformly intermixed, and (b) the relative measured pressure drop of 1.18 when the catalyst bed is made up of 95% of B Particles and 5% of D Particles and the B Particles and D Particles are uniformly mixed.

A further illustration of the benefits of the method of this invention involved a comparison of the pressure drops of three different loading configurations. The composition loading configurations of each such bed in such configuration and the relative measured pressure drops over each such bed in each such reactor are presented in Table 2. The feed was flowed downward through the catalyst bed.

TABLE 2

| Reactor Loading Configuration | | Measured Average Relative Pressure Drop |
| --- | --- | --- |
| (1) | 83% in a uniform mixture of 0.10-inch diameter particles in an upper bed; 17% in a uniform mixture of 0.063-inch diameter particles in a lower bed | 1.00 |
| (2) | 82% in a uniform mixture of 0.10-inch diameter particles in an upper bed; 18% in a uniform mixture of 0.063-inch diameter particles in a lower bed | 1.04 |
| (3) | 33% in a uniform mixture of 0.10-inch diameter particles in an upper bed; 67% as 0.063-inch diameter particles in a lower bed that is graded by progressively increasing pressure drops down the reactor in the downward direction of feed flow | 1.04 (1.59)* |

*projected from the Ergun Equation

Thus, in spite of the presence in the graded bed of 67% of the smaller 0.063-inch diameter particles, grading of the particles in the lower bed in the reactor afforded an overall pressure drop that was substantially smaller than the large relative pressure drop of 1.59 predicted for that catalyst bed by the Ergun Equation.

Figure 3:
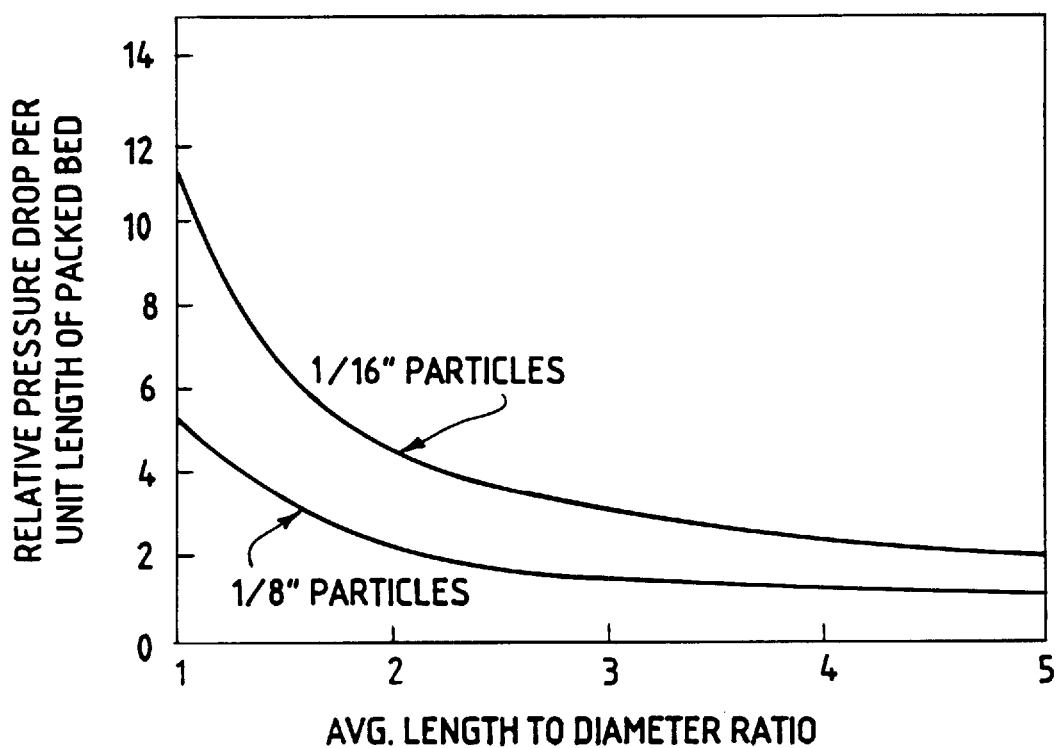
FIG. 3 is a graph showing the relationship between the measured relative pressure drop per unit length of packed bed and the average particle length-to-diameter ratio of the catalyst particles in the bed. The relationship is shown for (a) a first series of lots of catalyst particles, each lot in the series made up of particles having a particle diameter of ⅛-inch but with the average particle length-to-diameter ratio of the particles differing from lot to lot, and (b) a second series of lots of catalyst particles, each lot in the series made up of particles having a particle diameter ¹⁄₁₆-inch but with the average particle length-to-diameter ratio of the particles differing from lot to lot.

The dependence of the measured pressure drop on the measured particle length-to-diameter ratio is illustrated in FIG. 3. FIG. 3 shows that most, if not all, of the higher pressure ratio drop from decreasing particle diameter can be compensated by proper management of particle length-to-diameter ratio. This is a result of the extreme sensitivity of pressure drop to particles in the length-to-diameter ratio of 1 to 2, referred to as "shorts." Cylindrical particles having a length-to-diameter ratio less than one are commonly referred to as fines. Thus, one way to lower pressure drop is to minimize the amount of shorts and fines.

From the above description, it is apparent that the objects of the present invention have been achieved. While only certain embodiments and various modifications have been described, numerous alternative embodiments and various modifications will be apparent from the above description to those skilled in the art. These alternatives and embodiments are considered equivalents and within the spirit and scope of the present invention.

Having described the invention, what is claimed is:

1. A method for grading cylindrical, spherical or multilobe catalyst particles in a bed in order to reduce the pressure drop through the bed under particulate-free flow conditions, which method comprises:

providing a catalyst comprising cylindrical, spherical or multilobe catalyst particles, each of the catalyst particles having a longest dimension and a shortest dimension, segregated into catalyst manufacturing process lots, each of the lots ranging from about 100 pounds to about 10,000 pounds, and each of the lots associated with a relatively smaller representative sample of the lot;

ranking the lots by pressure drop by measuring at reproducible conditions the pressure drop across about one quart to about 3 gallons of each of the representative samples;

loading the lots in order of progressively increasing or decreasing pressure drop into a reactor having an inlet and an outlet, with the lot having the highest pressure drop near the outlet and the lot having the lowest pressure drop near the inlet, to form a graded bed wherein the catalyst particles throughout the bed have substantially the same shape and wherein the ratios of the longest dimension to the shortest dimension of the catalyst particles within the bed are progressively lower in the direction of feed flow; and passing a particulate-free feed through the bed and observing reduced pressure drop across the bed under particulate-free flow conditions, as compared to the pressure drop that would be exhibited at the same conditions by a reference bed which is otherwise identical but is formed by uniformly mixing lots of catalyst.

2. The method of claim 1 wherein the catalyst particles within the bed are graded such that the catalyst particles in progressively lower layers within the bed have progressively higher pressure drops and the feed flows downward through the catalyst bed.

3. The method of claim 1 wherein the catalyst particles within the bed are graded such that the catalyst particles in progressively higher layers within the bed have progressively higher pressure drops and the feed flows upward through the catalyst bed.

4. The method of claim 1 wherein the feed flows radially through the catalyst bed.

5. The method of claim 1 wherein the bed of catalyst particles is a packed bed.

* * * * *

UNITED STATES PATENT AND TRADEMARK OFFICE
CERTIFICATE OF CORRECTION

PATENT NO.: 5,837,128
DATED: November 17, 1998
INVENTOR(S): George A. Huff, Jr., Frederick T. Clark, James L. Taylor It is certified that error appears in the above-identified patent and that said Letters Patent is hereby corrected as shown below:

| Col. | Line | |
|---|---|---|
| 5 | 15 | "the .01 25-inch diameter" should read --the 0.125-inch diameter-- |
| 7 | 3 | "from about 100" should read --from about 1000-- |

Signed and Sealed this

Sixteenth Day of March, 1999

Attest:

Q. TODD DICKINSON

Attesting Officer

Acting Commissioner of Patents and Trademarks